(12) United States Patent
Krol et al.

(10) Patent No.: US 10,086,481 B2
(45) Date of Patent: Oct. 2, 2018

(54) CARRIER ARRANGEMENT FOR USE IN A METHOD FOR SIMULTANEOUSLY REPAIRING A PLURALITY OF COMPONENTS

(71) Applicant: SLM Solutions Group AG, Luebeck (DE)

(72) Inventors: Toni Adam Krol, Luebeck (DE); Eduard Gieser, Luebeck (DE); Dieter Schwarze, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 269 days.

(21) Appl. No.: 14/940,886

(22) Filed: Nov. 13, 2015

(65) Prior Publication Data

US 2016/0250724 A1   Sep. 1, 2016

(30) Foreign Application Priority Data

Nov. 21, 2014 (EP) ..................................... 14194272

(51) Int. Cl.
   *B23K 37/00*  (2006.01)
   *B23K 37/04*  (2006.01)
   (Continued)

(52) U.S. Cl.
   CPC ........ *B23K 37/0443* (2013.01); *B22F 3/1055* (2013.01); *B23K 26/342* (2015.10);
   (Continued)

(58) Field of Classification Search
   CPC .. B23K 37/0443; B23K 26/342; B22F 3/1055
   USPC .......................................................... 419/1
   See application file for complete search history.

(56) References Cited

U.S. PATENT DOCUMENTS

| | | | |
|---|---|---|---|
| 4,557,371 A | 12/1985 | Yonezawa | |
| 7,020,539 B1 | 3/2006 | Kovacevic et al. | |

(Continued)

FOREIGN PATENT DOCUMENTS

| | | |
|---|---|---|
| CN | 103338881 A | 10/2013 |
| EP | 2567785 A1 | 3/2013 |

(Continued)

OTHER PUBLICATIONS

European Search Report for related EP Patent Patent Application No. 14194272.2 dated Jun. 10, 2015 (4 pages).

(Continued)

*Primary Examiner* — Mark A Chapman
(74) *Attorney, Agent, or Firm* — Taft Stettinius & Hollister LLP

(57) ABSTRACT

A carrier arrangement (30) comprises a carrier element (34) having a carrier surface (36) and a plurality of supporting elements (38) attached to the carrier element (34), wherein each supporting element (38) has a supporting surface (40) extending from the carrier surface (36) of the carrier element (34) and being adapted to interact with a first surface (42) of a component (32) to be repaired. The carrier arrangement (30) further comprises a plurality of clamping elements (44), wherein at least a part of the clamping elements (44) are releasably attachable to the carrier element (34) in such a manner that a clamping surface (46) of the clamping elements (44), which is adapted to interact with a second surface (48) of a component (32) to be repaired, faces the supporting surface (40) of an associated supporting element (38) so as to sandwich the component (32) to be repaired therebetween in such a manner that the component (32) is fixed to the carrier element (34) with a repair site (50) of the component (32) facing away from the carrier surface (36) of the carrier element (34). A fastening device (72) of the carrier arrangement (30) is adapted to interact with a corresponding fastening device (74) of an apparatus (10) for repairing components (32) by selectively irradiating layers of a raw material powder applied to the repair sites (50) of the components (32) with electromagnetic or particle radiation.

18 Claims, 4 Drawing Sheets

Figure 1:
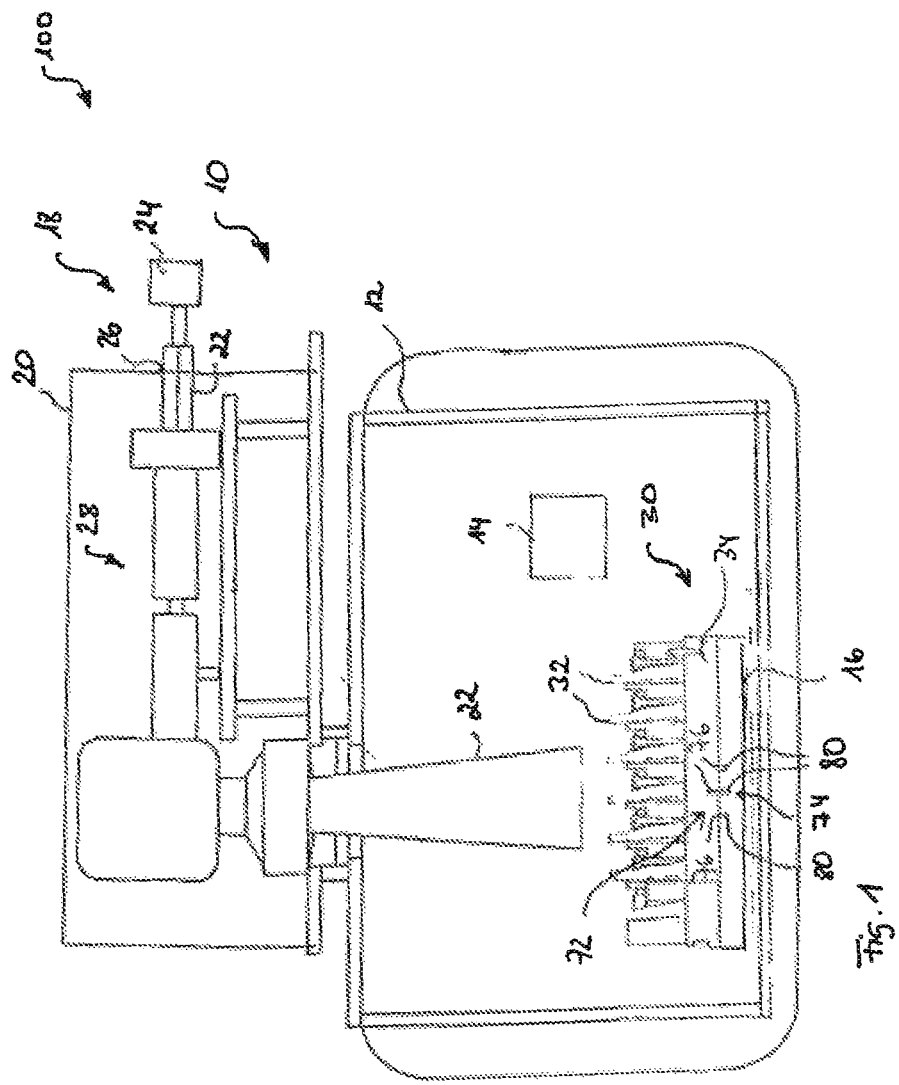

(51) Int. Cl.
  *B22F 3/105* (2006.01)
  *B23P 6/00* (2006.01)
  *B33Y 10/00* (2015.01)
  *B23K 26/342* (2014.01)
  *B33Y 30/00* (2015.01)
  *B29C 64/245* (2017.01)
  *B22F 5/04* (2006.01)
  *B22F 7/06* (2006.01)
  *B33Y 40/00* (2015.01)

(52) U.S. Cl.
  CPC ............... *B23P 6/002* (2013.01); *B23P 6/007* (2013.01); *B29C 64/245* (2017.08); *B33Y 10/00* (2014.12); *B33Y 30/00* (2014.12); *B22F 5/04* (2013.01); *B22F 2003/1056* (2013.01); *B22F 2003/1058* (2013.01); *B22F 2007/068* (2013.01); *B33Y 40/00* (2014.12); *Y02P 10/295* (2015.11)

(56) References Cited

U.S. PATENT DOCUMENTS

| | | | |
|---|---|---|---|
| 2011/0052386 A1 | 3/2011 | Schoonover et al. | |
| 2011/0241947 A1* | 10/2011 | Scott ................ | B22F 3/1055 343/700 MS |
| 2013/0309420 A1 | 11/2013 | Flesch et al. | |
| 2014/0301883 A1 | 10/2014 | Wiesner et al. | |
| 2015/0053291 A1* | 2/2015 | Hummel ............... | B22F 3/1055 137/884 |

FOREIGN PATENT DOCUMENTS

| | | |
|---|---|---|
| EP | 1793979 B2 | 4/2014 |
| JP | 5813943 U | 1/1983 |
| JP | 201126668 A | 2/2011 |
| JP | 201152686 A | 3/2011 |
| WO | 2002/34465 A1 | 5/2002 |
| WO | 2006/024373 A2 | 3/2006 |
| WO | 2014/171271 A1 | 10/2014 |

OTHER PUBLICATIONS

State Intellectual Property Office, Office Action, CN201510809658.1, dated May 4, 2017.

Office Action, JP2015-212147, dated Nov. 1, 2016, with partial translation, 9 pages.

European Search Report for related EP Patent Application No. 14194272.2 dated Jun. 10, 2015 (4 pages).

* cited by examiner

CARRIER ARRANGEMENT FOR USE IN A METHOD FOR SIMULTANEOUSLY REPAIRING A PLURALITY OF COMPONENTS

The present invention relates to a carrier arrangement for use in a method for simultaneously repairing a plurality of components by irradiating layers of a raw material powder with electromagnetic or particle radiation. Further, the invention relates to a method and an system for simultaneously repairing a plurality of components by irradiating layers of a raw material powder with electromagnetic or particle radiation while employing a carrier arrangement of this kind.

Aircraft components such as, for example, turbine blades or other turbomachine components as well as other structural components which are operated under severe mechanical and/or thermal loads typically are subject to wear. In case of turbine blades, in particular a tip region, i.e. a radially outermost region of the turbine blades, during operation of the turbomachine, suffers from thermal stresses which may induce cracks and hence weaken the mechanical strength of the turbine blade to an undue extent. Moreover, turbine blades, in particular in their tip region, are prone to damages caused by external impact such as, for example, bird strike.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. An apparatus for producing moulded bodies from pulverulent raw materials by selective laser melting is described, for example, in EP 1 793 979 B2.

Powder bed fusion may be employed for the production of prototypes, tools, replacement parts or medical prostheses on the basis of CAD data. Further, powder bed fusion may be used for repairing components such as, for example, turbomachine components or other structural components which are subject to wear.

The invention is directed at the object of providing a carrier arrangement for use in a method for simultaneously repairing a plurality of components by irradiating layers of a raw material powder with electromagnetic or particle radiation which allows an accurate positioning as well as a secure fixation of the components to be repaired. Further, the invention is directed at the object of providing a method and a system for simultaneously repairing a plurality of components by irradiating layers of a raw material powder with electromagnetic or particle radiation while employing a carrier arrangement of this kind.

This object is addressed by a carrier arrangement as defined in claim 1, a method as defined in claim 10 and a system as defined in claim 18.

A carrier arrangement comprises a carrier element having a carrier surface. In a preferred embodiment of the carrier arrangement, the carrier element is designed substantially in the form of a plate and has a planar carrier surface. A plurality of supporting elements is attached to the carrier element. Each supporting element has a supporting surface extending from the carrier element and being adapted to interact with a first surface of a component to be repaired. In particular, the supporting surface of each supporting element is adapted to be in contact with and support the first surface of the component to be repaired. It is not necessary for the supporting surface of the supporting element to contact the carrier surface of the carrier element. Instead, the supporting surface of the supporting element may extend from the carrier surface of the carrier element while being in contact therewith or while being arranged at a distance therefrom.

Moreover, the carrier arrangement comprises a plurality of clamping elements. At least a part of the clamping elements are releasably attachable to the carrier element in such a manner that a clamping surface of the clamping elements, which is adapted to interact with a second surface of a component to be repaired, faces the supporting surface of an associated supporting element so as to sandwich the component to be repaired therebetween in such a manner that the component is fixed to the carrier element with a repair site of the component facing away from the carrier surface of the carrier element. Like the supporting surfaces of the supporting elements, also the clamping surfaces of the clamping elements may extend from the carrier surface of the carrier element while being in contact therewith or while being arranged at a distance therefrom. In any case, the supporting elements and at least a part of the clamping elements are arranged on the carrier element relative to each other in such a manner that the clamping surface of a clamping element faces the supporting surface of a respective associated supporting element and is arranged at a predetermined distance therefrom. The component to be repaired may be any component, such as, for example, a machine component or the like, but preferably is a high value component suitable for operation under high mechanical and thermal loads. In particular, the component is a turbine blade.

Since at least a part of the clamping elements are releasably attachable to the carrier element, a component to be repaired may be arranged on the carrier element with its first surface abutting against the supporting surface of a supporting element while the associated clamping element still is not attached in place to the carrier element. Specifically, the clamping element may not be attached to the carrier element at all, while the component to be repaired is arranged on the carrier element. It is, however, also conceivable that the clamping element is already connected to the carrier element, but still movable relative to the carrier element and the associated supporting element so that the component to be repaired can be arranged on the carrier element at a desired position in a comfortable manner without being hindered by the clamping element. In a next step, the component may be securely fixed to the carrier element by attaching the clamping element to the carrier element in such a manner that the clamping surface of the clamping element comes into contact with the second surface of the component and finally presses the component against the supporting surface of the supporting element.

A shape of the supporting surface of the supporting elements may be adjusted to the shape of the first surface of the component to be repaired. Similarly, a shape of the clamping surface of the clamping elements may be adjusted to the shape of the second surface of the component to be repaired. For example, the supporting surface of the supporting elements may have a contour that closely follows a contour of the first surface of the component to be repaired. Similarly, the clamping surface of the clamping elements may have a contour that closely follows a contour of the second surface of the component to be repaired. Preferably, however, the clamping surface of the clamping elements is designed so as to establish a line-shaped contact area with the second surface of the component to be repaired. Basically, all supporting elements of the carrier arrangement may have the same shape. Similarly, all clamping elements of the carrier arrangement may have the same shape. The carrier arrangement then is particularly suitable for the attachment of a plurality of components to be repaired which have a similar shape. It is, however, also conceivable to provide the carrier arrangement with supporting elements having differently shaped supporting surfaces and/or clamping elements having differently shaped clamping surfaces in case it is desired to use the carrier arrangement for fixing components having differently shaped first and/or second surfaces.

By means of a supporting element and an associated clamping element of the carrier arrangement, a component to be repaired, is fixed in its position on the carrier element such that a repair site of the component faces away from the carrier surface of the carrier element. Preferably, the supporting elements and the clamping elements are designed in such a manner that the component to be repaired extends further from the carrier surface of the carrier element than the supporting elements and the clamping elements. The repair site of the component to be repaired then, with respect to the carrier surface of the carrier element, is arranged above the supporting elements of the clamping elements. In case the component to be repaired is designed in the form of a turbine blade, the component may, for example, be positioned on the carrier such that a tip region of the turbine blade, which in particular is subject to wear and damages caused by external impact, faces away from the carrier surface and, with respect to the carrier surface of the carrier element, is arranged above the supporting elements and the clamping elements. To the contrary, a base segment of the turbine blade, which during operation of the turbine blade in a turbomachine is attached to a rotor of the turbomachine, may face the carrier surface of the carrier element.

Finally, the carrier arrangement comprises a fastening device which is adapted to interact with a corresponding fastening device of an apparatus for repairing components by selectively irradiating layers of a raw material powder applied to the repair sites of the components with electromagnetic or particle radiation. In the apparatus for repairing components, a repair segment is generated on the repair site of each component by an additive layer construction method. The fastening device may, for example, comprise positioning pins a first end of which is received in corresponding bores formed in a bottom surface of the carrier element which is arranged opposed to the carrier surface of the carrier element. A second end of the positioning pins may be adapted to be received in corresponding bores formed in a bearing element of the apparatus for repairing components which is designed to support the carrier arrangement in the apparatus. Moreover, the fastening device may comprise rails and/or grooves formed on the carrier element of carrier arrangement and being adapted to interact with corresponding grooves and/or rails of the corresponding fastening device of the apparatus. Finally, the fastening device may comprise suitable fixation means provided, for example, on the carrier element of the carrier arrangement which may be adapted to interact with corresponding fixation means of the apparatus in order to securely fasten the carrier arrangement to the apparatus.

The carrier arrangement thus allows a plurality of components to be repaired to be securely and accurately fixed to the carrier element of the carrier arrangement in a desired position and orientation in a comfortable manner. The carrier arrangement with the components fixed thereto then can be transferred to the apparatus for repairing components by selectively irradiating layers of a raw material powder applied to the repair sites of the components with electromagnetic or particle radiation, wherein the plurality of components can be simultaneously repaired by generating repair segments using an additive layer construction method.

The repair sites of the components to be repaired may be processed by removing respective damaged segments of the components. For example, the damaged segments of the components may be removed by machining the components, in particular by milling the components. Removal of the damaged segments of the components allows repair segments to be produced on intact repair sites resulting in a high resistance of the repaired components against thermal and mechanical loads. Basically, the repair sites of the components may be processed by removing respective damaged segments of the components before the components are fixed to the carrier element of the carrier arrangement. A particularly efficient repair process, however, can be achieved when the damaged segments of the components are removed after the components are fixed to the carrier element of the carrier arrangement. In a preferred embodiment of the carrier arrangement, the fastening device therefore is adapted to also interact with a corresponding fastening device of a machining tool for machining the repair sites of the components to be repaired. The carrier arrangement then can be used for supporting the components during both removal of the damaged segment in a machining tool and replacement of the damaged segments by respective repair segments using an additive layer construction method.

At least a part of the supporting elements may be attached to the carrier element in a row pattern. At least a part of the clamping elements may be releasably attachable to respective supporting elements arranged in a first row of the row pattern in such a manner that their clamping surfaces face the supporting surfaces of their associated supporting elements which are arranged in an adjacent row of the row pattern. Preferably, the clamping elements are releasably attachable to respective supporting elements arranged in the first row of the row pattern in such a manner that their clamping surfaces face away from the supporting surfaces of the supporting elements to which they are releasably attachable. The clamping surfaces of the clamping elements then automatically face the supporting surfaces of their associated supporting elements arranged in the second row of the row pattern and thus are ready to interact with the supporting surfaces of the associated supporting elements so as to fix components to be repaired to the carrier element of the carrier arrangement.

The supporting elements then fulfill the double function of supporting the components to be repaired on the one hand and of acting as bearing elements for the clamping elements on the other hand. Additional bearing elements for positioning and attaching the clamping elements on the carrier element then can be dispensed with. The clamping elements may be releasably attachable to respective supporting elements by means of suitable attaching devices such as, for example, screws. In any case, the attaching devices allow the clamping elements to be either entirely detached from the respective supporting elements or to be at least released from the respective supporting elements in so far that they are movable relative to the supporting elements and the carrier element when the components to be repaired are arranged in place on the carrier element by bringing their first surfaces in contact with the respective supporting surfaces of the supporting elements.

At least a part of the clamping elements may be releasably attachable to respective supporting elements by means of an attaching device. The attaching device, for example, may be designed in the form of a screw. At least a part of the clamping elements may comprise a slanted surface which may be adapted to interact with a surface formed on a supporting element in order to urge the clamping surface of the clamping element toward the supporting surface of the associated supporting element when the attaching device is fastened. Thus, by the interaction of the slanted surface of the clamping element with the surface of the supporting element, the clamping element and hence its clamping surface may be moved in the direction of the associated supporting element and hence its supporting surface so as to allow a component to be repaired arranged between the clamping element and the associated supporting element to be securely fixed to the carrier element. Preferably, the surface of the supporting element which interacts with the slanted surface of the clamping element is a plane surface.

The attaching device may be adapted to extend through a bore formed in the clamping element and to engage with a thread provided in the supporting element. As a result, easy but still secure fixation of the clamping element and consequently the component to be repaired is made possible.

The carrier arrangement may further comprise a first end element which is attached to the carrier element in a first edge region thereof. The first end element may have at least one supporting surface extending from the carrier surface of the carrier element and being adapted to interact with a first surface of the component to be repaired. Preferably, the first end element is provided with a plurality of supporting surfaces, wherein the number of supporting surfaces provided on the first end element preferably corresponds to the number of clamping elements arranged in a row on the carrier element adjacent to the first end element.

The carrier arrangement may also be provided with a second end element which is attached to the carrier element in a second edge region thereof. Preferably, the first end element and the second end element are provided in opposing edge regions of the carrier element. The second end element may be configured to allow at least one clamping element to be releasably attached thereon in such a manner that its clamping surface faces the supporting surface of its associated supporting element. Preferably, the second end element is configured to allow the releasable attachment of a plurality of clamping elements, wherein the number of clamping elements which are releasably attachable to the second end element preferably corresponds to the number of supporting elements arranged in a row on the carrier element adjacent to the second end element.

At least a part of the supporting elements and/or the first end element may comprise a heating element/heating element adapted to heat the supporting surface(s). By integrating heating elements into the supporting elements and/or the first end element, the provision of separate heating elements on the carrier element can be dispensed with. A heating element adapted to heat the supporting surface of a supporting element and/or the first end element allows heating of a component to be repaired supported on the supporting element and/or the first end element and thus reducing thermal stresses occurring within the component upon generating the repair segment on the repair site of the component by an additive layer construction method. This provides for a crack-free and thus high quality repair of high value components such as, for example, turbomachine components, in particular turbine blades.

In a method for repairing a plurality of components, the components to be repaired are arranged on a carrier element of the carrier arrangement in such a manner that a first surface of at least a part of the components interacts with a supporting surface of a supporting element which extends from a carrier surface of the carrier element. A plurality of clamping elements is attached to the carrier element in such a manner that a clamping surface of each clamping element interacts with a second surface of the component to be repaired so as to sandwich the component between the clamping surface of the clamping element and the supporting surface of an associated supporting element and to thereby fix the component to the carrier element with a repair site of the component facing away from the carrier surface of the carrier element. Specifically, the clamping elements are attached to the carrier elements only after the components to be repaired have been positioned on the carrier element with their first surfaces in contact with the supporting surfaces of the supporting elements.

After securely fixing the components to be repaired on the carrier element of the carrier arrangement, the carrier arrangement is fastened to an apparatus for repairing components by selectively irradiating layers of raw material powder applied to the repair sites of the components with electromagnetic or particle radiation. In said apparatus, the components are repaired by selectively irradiating layers of a raw material powder applied to the repair sites of the components with electromagnetic or particle radiation, i.e. by an additive layer construction method.

The carrier arrangement with the components to be repaired fixed thereto, prior to being fastened to the apparatus for repairing components by irradiating layers of a raw material powder applied to the repair sites of the components with electromagnetic or particle radiation, may be fastened to a machining tool for machining the repair sites of the components.

At least a part of the supporting elements may be attached to the carrier element in a row pattern. Further, at least a part of the clamping elements may be releasably attached to respective supporting elements arranged in a first row of the row pattern in such a manner that their clamping surfaces face the supporting surfaces of their associated supporting elements which are arranged in an adjacent row of the row pattern.

Preferably, at least a part of the clamping elements are releasably attached to respective supporting elements by means of an attaching device. At least a part of the clamping elements may comprise a slanted surface which interacts with a surface formed on a supporting in order to urge the clamping surface of the clamping element toward the supporting surface of the associated supporting element when the attaching device is fastened. The attaching device may be guided through a bore formed in the clamping element and may engage with a thread provided in the supporting element.

At least one component to be repaired may be arranged on the carrier element of the carrier arrangement in such a manner that its first surface interacts with a supporting surface of a first end element attached to the carrier element in a first edge region thereof which extends from the carrier surface of the carrier element. Alternatively or additionally thereto, at least one clamping element may be attached to a second end element attached to the carrier element in a second edge region thereof in such a manner that its clamping surface faces the supporting surface of its associated supporting element.

The supporting surface(s) of at least a part of the supporting elements and/or the first end element may be heated so as to allow heating of components to be repaired supported on the supporting elements and thus reducing thermal stresses occurring within the components upon generating the repair segment on the repair site of the components by an additive layer construction method.

A system for repairing a plurality of components comprises an above described carrier arrangement. In addition, the system comprises an apparatus for repairing components by selectively irradiating layers of a raw material powder applied to the repair sites of the components with electromagnetic or particle radiation. Said apparatus comprises a corresponding fastening device which is adapted to interact with the fastening device of the carrier arrangement. By the interaction of the fastening device of the carrier arrangement and the corresponding fastening device of the apparatus, the carrier arrangement with the components to be repaired fixed thereto can be accurately positioned in and securely fixed to the apparatus.

The corresponding fastening device of the apparatus may, for example, comprise bores formed in a bearing surface of a bearing element of the apparatus which are suitable to receive respective positioning pins of the fastening device of the carrier arrangement. Moreover, the corresponding fastening device may comprise grooves and/or rails formed, for example, on the bearing element and being adapted to interact with corresponding rails and/or grooves of the fastening device carrier arrangement. Finally, the corresponding fastening device may comprise suitable fixation means provided, for example, on the bearing element which may be adapted to interact with corresponding fixation means of the carrier arrangement in order to securely fasten the carrier arrangement to the apparatus. The bearing element of the apparatus may be disposed in a process chamber of the apparatus and may be a rigidly fixed bearing element. Preferably, however, the bearing element is designed to be displaceable in vertical direction. The process chamber accommodating the bearing element may be sealable against the ambient atmosphere, i.e. against the environment surrounding the process chamber, in order to be able to maintain a controlled atmosphere, in particular an inert atmosphere within the process chamber.

The apparatus further comprises a powder application device which is adapted to apply a raw material powder onto the carrier arrangement such that repair sites of the components to be repaired fixed thereto are covered by the raw material powder. In particular, the powder application device may be adapted to apply the raw material powder in such a manner that the carrier arrangement with the components to be repaired fixed thereto is embedded within the raw material powder. It is, however, also conceivable to manually apply raw material powder onto the carrier arrangement up to a level that the carrier arrangement with the components to be repaired fixed thereto is embedded within the raw material powder, so that a further powder layer applied by the powder application device already covers the repair sites of the components. The raw material powder may be adapted to the material of the component to be repaired. Preferably, the raw material powder consists of the same material as the component to be repaired. In case the component to be repaired is designed in the form of a turbine blade, the raw material powder preferably is a metallic powder, in particular a metal alloy powder, and preferably a Ti, Ni or Fe based (super)alloy or a tungsten molybdenum alloy powder. It is, however, also conceivable to use a ceramic powder or a powder containing different materials as the raw material powder. The raw material powder may have any suitable particle size or particle size distribution. It is, however, preferable to process powders of particle sizes <100 µm.

Finally, the apparatus may comprise an irradiation device which is adapted to selectively irradiate electromagnetic or particle radiation onto the raw material powder applied onto the carrier arrangement so as to produce a repair segment on the repair sites of the components by an additive layer construction method. The raw material powder applied onto the carrier arrangement may be subjected to electromagnetic or particle radiation in a site-selective manner in dependence on the desired geometry of the repair segment that is to be produced on the repair site of the component. The irradiation device preferably is adapted to irradiate radiation onto the raw material powder which causes a site-selective melting of the raw material powder particles. The irradiation device may comprise at least one radiation source, in particular a laser source, and at least one optical unit for guiding and/or processing a radiation beam emitted by the radiation source. The optical unit may comprise optical elements such an object lens, in particular an f-theta lens, and a scanner unit, the scanner unit preferably comprising a diffractive optical element and a deflection mirror.

By selectively irradiating a layer of raw material powder applied onto the repair sites of the components with electromagnetic or particle radiation, a first layer of the repair segments is generated on the repair sites of the components. The additive layer construction method employed for generating the repair segments may further include the steps of repeatedly vertically displacing the bearing element of the apparatus with the carrier arrangement supported thereon so as to compensate for the height of the already generated layer(s) of the repair segments, applying a further layer of raw material powder onto the carrier arrangement such that the components including the already generated layer(s) of the repair segments are covered by the raw material powder and selectively irradiating the layer of raw material powder applied onto the components including the already generated layer(s) of the repair segments so as to generate a further layer of the repair segments.

Figure 2:
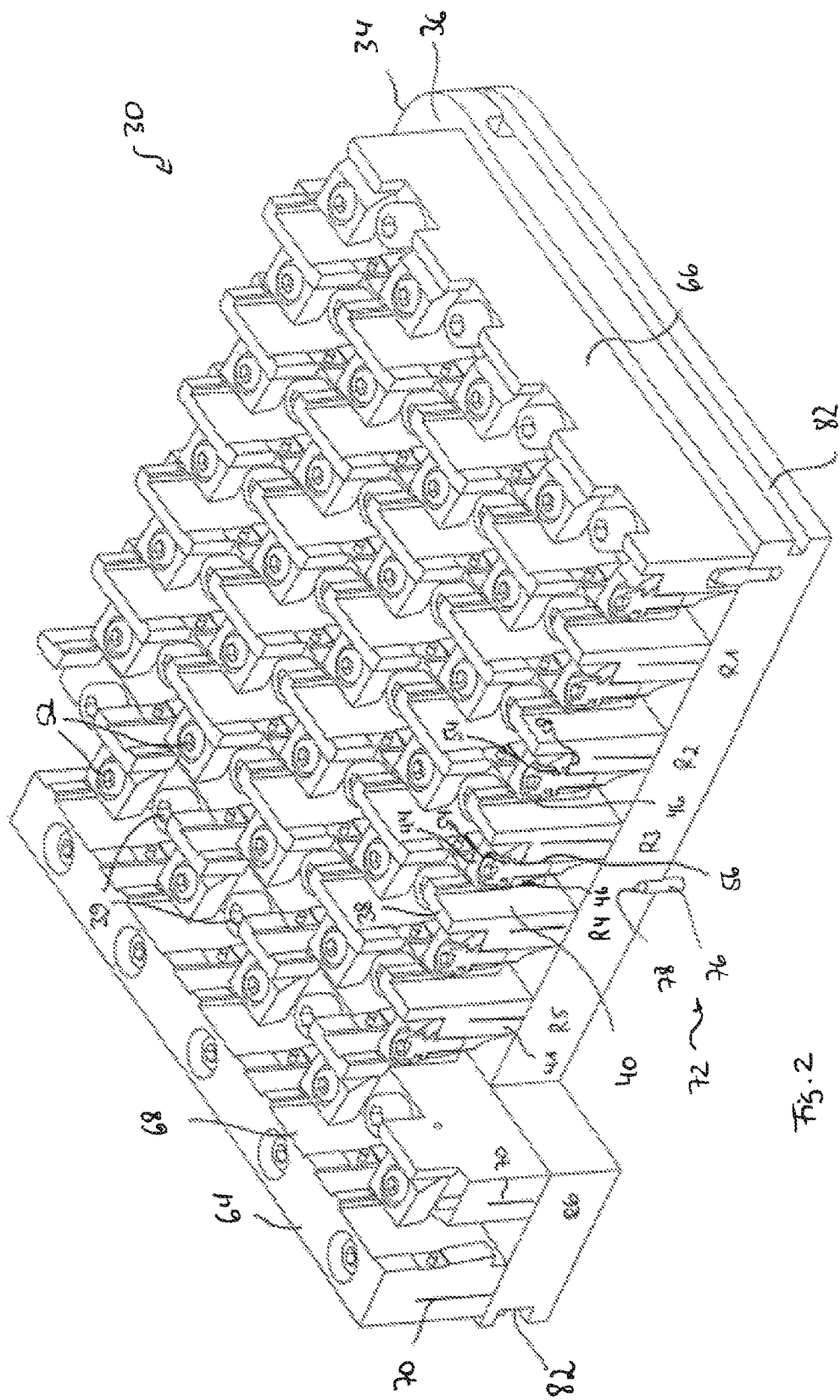
Figure 3:
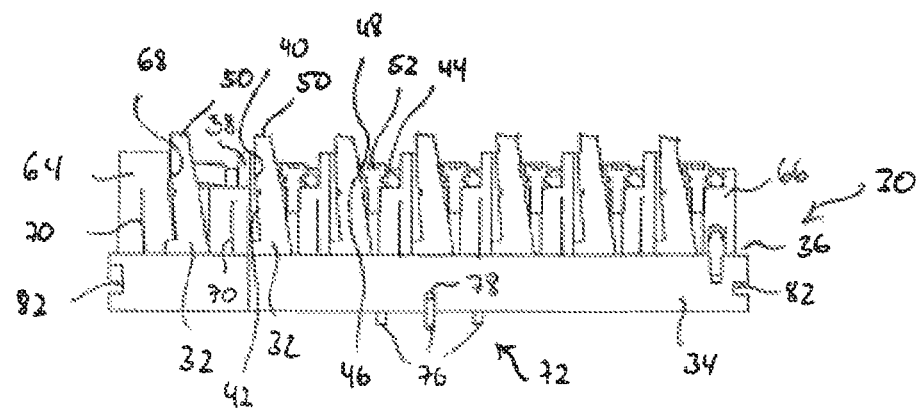
Figure 4:
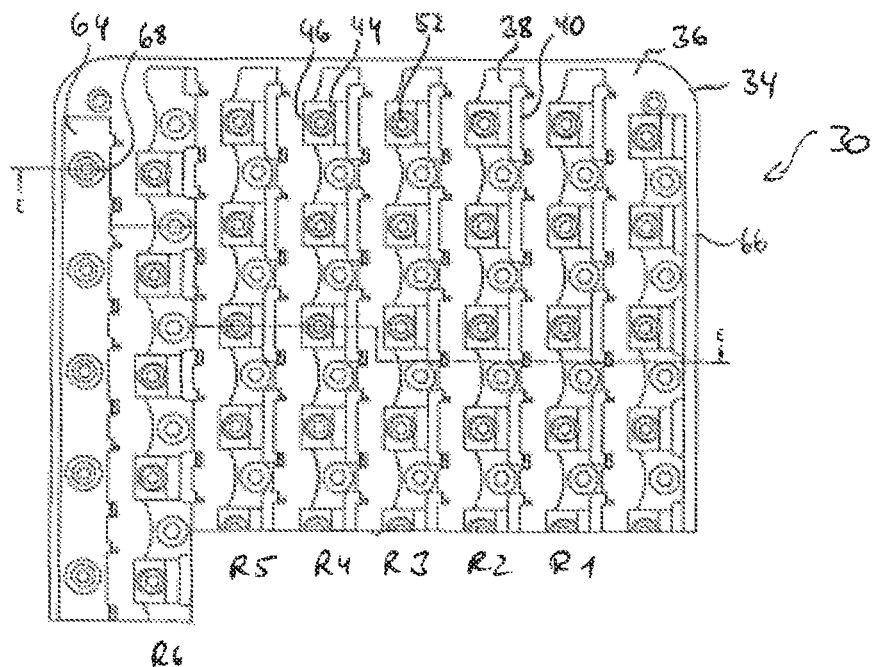
Figure 5:
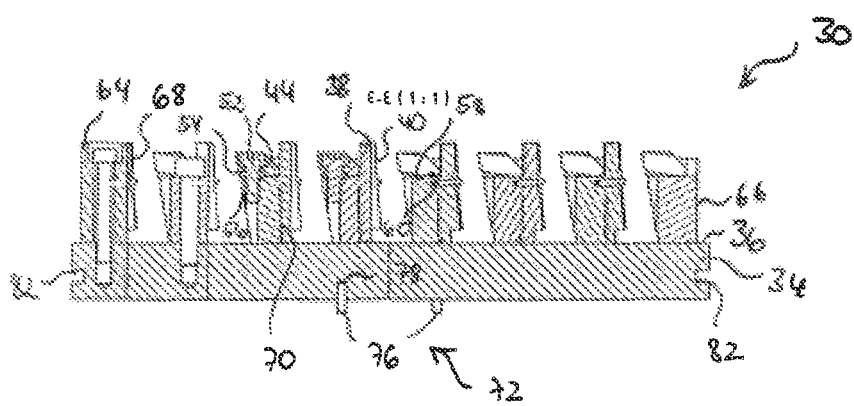

Preferred embodiments of the invention in the following are explained in greater detail with reference to the accompanying schematic drawings, in which:

FIG. 1 shows a system for simultaneously repairing a plurality of components by a an additive layer construction method, FIG. 2 shows a detailed three dimensional view of a carrier arrangement employed in the system according to FIG. 1, FIG. 3 shows a side view of the carrier arrangement according to FIG. 2, FIG. 4 shows a top view of the carrier arrangement according to FIG. 2, FIG. 5 shows a sectional view of the carrier arrangement according to FIG. 2 taken along the line E-E in FIG. 4.

FIG. 1 shows a system 100 comprising an apparatus 10 for manufacturing a component by an additive layer construction method. The apparatus 10 comprises a process chamber 12. A powder application device 14, which is disposed in the process chamber 12, serves to apply a raw material powder onto a bearing element 16 or a component or arrangement positioned thereon as will be described in greater detail below. The process chamber 12 is sealable against the ambient atmosphere, i.e. against the environment surrounding the process chamber 12. The bearing element 16 is designed to be displaceable in a vertical direction so that, with increasing construction height of a component, as it is built up in layers from the raw material powder on the bearing element 16, the bearing element 16 can be moved downwards in the vertical direction.

The apparatus 10 further comprises an irradiation device 18 for selectively irradiating laser radiation onto the raw material powder applied onto the bearing element 16 or a component or arrangement positioned thereon. By means of the irradiation device 18, the raw material powder may be subjected to laser radiation in a site-selective manner in dependence on the desired geometry of the component that is to be produced. The irradiation device 18 has a hermetically sealable housing 20. A radiation beam 22, in particular a laser beam, provided by a radiation source 24, in particular a laser source which may, for example, comprise a diode pumped Ytterbium fibre laser emitting laser light at a wavelength of approximately 1070 to 1080 nm is directed into the housing 20 via an opening 26.

The irradiation device 18 further comprises an optical unit 28 for guiding and processing the radiation beam 22. The optical unit 28 may comprise a beam expander for expanding the radiation beam 22, a scanner and an object lens. Alternatively, the optical unit 28 may comprise a beam expander including a focusing optic and a scanner unit. By means of the scanner unit, the position of the focus of the radiation beam 22 both in the direction of the beam path and in a plane perpendicular to the beam path can be changed and adapted. The scanner unit may be designed in the form of a galvanometer scanner and the object lens may be an f-theta object lens.

The bearing element 16 of the apparatus 10 is adapted to support a carrier arrangement 30 of the system 100 with a plurality of components 32 to be repaired fixed thereto. Detailed views of the carrier arrangement 30 are depicted in FIGS. 2 to 5. The carrier arrangement 30 comprises a carrier element 34 which in the embodiment of a carrier arrangement 30 shown in the drawings is designed in the form of a plate and has a plane carrier surface 36. A plurality of supporting elements 38 are attached to the carrier element 34. In the embodiment of a carrier arrangement 30 shown in the drawings, the supporting elements 38 are designed separate from the carrier element 34, and removably attached thereto by means of screws 39. Positioning pins may be used for simplifying positioning and orienting the supporting elements 38 on the carrier element. It is, however, also conceivable, to provide the carrier arrangement 30 with supporting elements 38 which are formed integral with or fixedly attached to the carrier element 34.

Each supporting element 38 has a supporting surface 40 which is defined on a base portion 41 of the supporting element 38 and extends from the carrier surface 36 of the carrier element 34. The supporting surface 40 of each supporting element 38 is adapted to interact with a first surface 42 of a component 32 to be repaired, wherein the shape of the supporting surface 40 has a contour which closely follows the contour of the first surface 42 of the component 32, see in particular FIG. 3. Thus, the component 32 to be repaired, when being arranged on the carrier element 34, via its first surface 42, is supported by the supporting surface 40 of the supporting element 38.

Further, the carrier arrangement 30 comprises a plurality of clamping elements 44. Most of the clamping elements 44 are releasably attachable to the carrier element 34 in such a manner that a clamping surface 46, which is adapted to interact with a second surface 48 of the component 32 to be repaired, faces the supporting surface 40 of an associated supporting element 38, see FIG. 3. The clamping surface 46 of the clamping elements 44 is designed so as to establish a line-shaped contact area with the second surface 48 of the component 32 to be repaired. Thus, by the interaction of the clamping element 44 with an associated supporting element 38, a component 32 to be repaired is sandwiched between the clamping surface 46 of the clamping element 44 and the supporting surface 40 of an associated supporting element 38. Thereby, the component 32 is securely fixed to the carrier element 34, wherein a repair site 50 faces away from the carrier surface 36 of the carrier element 34.

The supporting elements 38 and the clamping elements 44 are designed in such a manner that the components 32 to be repaired extent further from the carrier surface 36 of the carrier element 34 then the supporting elements 38 and the clamping elements 44. In other words, the repair sites 50 of the components 32, with respect to the carrier element 34, are disposed above the supporting elements 38 and the clamping elements 44.

The supporting elements 38 are arranged on the carrier element 34 in a row pattern. In the embodiment of a carrier arrangement 30 shown in the drawings, six rows R1 to R6 of supporting elements 38 are arranged on the carrier element 34. As becomes apparent in particular from FIGS. 2, 3 and 5, most of the clamping elements 44 are releasably attached to a supporting element 38 arranged in a first row of the row pattern in such a manner that its clamping surface 46 faces the supporting surface 40 of its associated supporting element 38 which is arranged in an adjacent row off the row pattern. For example, clamping elements 44 attached to supporting elements 38 positioned in a first row R1 of the row pattern are oriented in such a manner that their clamping surfaces 46 face the supporting surfaces 40 of the associated supporting elements 38 positioned in a second row R2 of the row pattern. The clamping elements 44 are releasably attached to the supporting elements 38 by means of attaching devices 52 which are designed in the form of screws. Each attaching device 52 extends through a bore 54 formed in the clamping element 44 and engages with a thread 56 provided in the supporting element 38. Thus, the clamping elements 44 can be detached from the supporting elements 38 or at least released from the supporting elements 38 in so far that they are movable relative to the supporting elements 38 and the carrier element 34.

Each clamping element 44 comprise a slanted surface 58 adapted to interact with a plane surface 60 formed on the supporting element 38 to which the clamping element 44 is attached (see in particular FIG. 5). When the attaching device 52 is fastened, due to the interaction of the slanted surface 58 of the clamping device 44 with the surface 60 of the supporting element 38, the clamping element 44 and hence its clamping surface 46 is urged in the direction of the associated supporting element 38 and hence its supporting surface 40. As a result, a component 32 to be repaired which is arranged between the clamping element 44 and the associated supporting element 38 is securely fixed to the carrier element 34.

Further, the carrier arrangement 30 comprises a first end element 64 which is attached to the carrier element 34 in a first edge region thereof. A second end element 66 is attached to the carrier element 34 and a second edge region thereof, the second edge region being oriented opposed to the first edge region. The first end element 64 is provided with a plurality of supporting surfaces 68 which extend from the carrier surface 36 of the carrier element 34 and are adapted to interact with respective first surfaces 42 of components 32 to be repaired. The second end element 66 is configured to allow clamping elements 44, which interact with supporting elements 38 arranged in the first row R1 of the row pattern to attach components 32 to be repaired to the carrier element 34, to be releasably attached thereon in such a manner that their clamping surfaces 46 face the supporting surfaces 40 of the associated supporting elements 38.

As indicated in FIG. 2, the supporting elements 38 comprise heating elements 70 which are adapted to heat the supporting surface 40 of the supporting elements 38 and the supporting surfaces 68 formed on the first end element 64. Thus, components 32 to be repaired which, via their first surface 42, are in close contact with the supporting elements 38 and the first end element 64, respectively, can be heated.

Finally, the carrier arrangement 30 comprises a fastening device 72 which is adapted to interact with a corresponding fastening device 74 of the apparatus 10, see FIGS. 1, 2, 3 and 5. The fastening device 72 comprises positioning pins 76 which are received in bores 78 formed in the carrier element 34 as well as in bores 80 provided in the bearing element 16. Furthermore, the carrier arrangement 30 comprises grooves 82 which are formed in side faces of the carrier element 34 and which are adapted to interact with corresponding rails provided in a transport vehicle (not shown in the drawings) when the carrier arrangement 30 has to be transported, for example from a machining tool to the apparatus 10.

As shown in the drawings, by the interaction of the fastening device 72 of the carrier arrangement 30 with the corresponding fastening device 74 of the apparatus 10, the carrier arrangement 30 with the components 32 to be repaired fixed thereto can be accurately positioned in the process chamber 12 of the apparatus 10 and be securely fixed in place. The fastening device 72, however, is also adapted to interact with a corresponding fastening device of a machining tool (not shown in the drawings) for machining the repair sites 50 of the components 32 to be repaired. The fastening device of a machining tool may have a design which is similar to that of the fastening device 74 of the apparatus 10.

In order to repair the components 32, the components 32, in a first step, are arranged on the carrier element 34 of the carrier arrangement 30 in such a manner that their first surfaces 42 come into contact with a respective supporting surface 40 of a supporting element 38 or a supporting surface 68 of the first end element 64. While the components 32 are positioned on the carrier element 34, the clamping elements 44 are still not in their final position, i.e. the clamping elements 44 are either entirely detached from the supporting elements 38 and the second end element 66, respectively, or at least released from the supporting elements 38 and the second end element 66, respectively, in so far that they are movable relative to the supporting elements 38, the second end element 66 and the carrier element 34. Thus, the positioning of the components 32 on the carrier element 34 is not conducted by the clamping elements 44.

In a second step, the clamping elements 44 are attached in place so that their clamping surfaces 46 press the components 32 against a supporting surface 40 of an associated supporting element 38 or a supporting surface 68 provided on the first end element 66. As a result, the components 32 are securely fixed to the carrier element 34 with their repair sites 50 facing away from the carrier surface 36 of the carrier element 34.

The carrier arrangement 30 with the components 32 attached thereto then is transferred to the machining tool and fixed thereto by bringing the fastening device 72 of the carrier arrangement 30 into engagement with the fastening device of the machining tool. Within the machining tool, the repair sites 50 are processed by machining the repair sites 50 with a cutting tool. Since the repair sites 50, with respect to the carrier element 34, are arranged above the supporting elements 38, the clamping elements 44 and the end elements 64, 66 of the carrier arrangement 30, operation of the cutting tool is not affected by the components of the carrier arrangement 30.

After completion of the machining step, the carrier arrangement 30 is released from the machining tool and transferred to the apparatus 10. The carrier arrangement 30 is positioned on the bearing element 16 of the apparatus 10 and fixed thereto by the interaction of the fastening device 72 of the carrier arrangement 30 with the fastening device 74 of the apparatus 10. Thereafter, raw material powder is manually applied onto the carrier arrangement 30 up to a level that the carrier arrangement 30 with the components 32 to be repaired fixed thereto is embedded within the raw material powder. The powder application device 14 then applies a layer of raw material powder onto the carrier arrangement 30 and the components 32 which covers the repair sites 50 of the components 32. This layer of raw material powder then is selectively irradiated with the radiation beam 22. In particular, the radiation beam 22 is directed over the raw material powder layer in accordance with CAD data of the repair segments to be produced. After the first layer of a repair segment to be produced on the repair sites 50 of the components 32 is completed, the bearing element 16 and the carrier arrangement 30 are lowered in a vertical direction allowing the application of a successive powder layer by means of the powder application device 14. Thereafter, the successive powder layer is irradiated by means of the irradiation device 18. Thus, layer by layer, the repair segments are built up on the repair sites 50 of the components 32.

During building up the repair segments by an additive layer construction method, the components 32 to be repaired are heated by the heating element 70 integrated into the supporting elements 38 and the first end element 64. Thus thermal stresses occurring within the components 32 upon generating the repair segment can be reduced.

The invention claimed is:

1. A carrier arrangement comprising:
   a carrier element having a carrier surface,
   a plurality of supporting elements attached to the carrier element, wherein each supporting element has a supporting surface extending from the carrier surface of the carrier element and being adapted to interact with a first surface of a component to be repaired,
   a plurality of clamping elements, wherein at least a part of the clamping elements are releasably attachable to the carrier element in such a manner that a clamping surface of the clamping elements, which is adapted to interact with a second surface of a component to be repaired, faces the supporting surface of an associated supporting element so as to sandwich the component to be repaired therebetween in such a manner that the component is fixed to the carrier element with a repair site of the component facing away from the carrier surface of the carrier element, and
   a fastening device adapted to interact with a corresponding fastening device of an apparatus for repairing components by selectively irradiating layers of a raw material powder applied to the repair sites of the components with electromagnetic or particle radiation.

2. The carrier arrangement according to claim 1,
wherein the fastening device is adapted to also interact with a corresponding fastening device of a machining tool for machining the repair sites of the components to be repaired.

3. The carrier arrangement according to claim 1,
wherein at least a part of the supporting elements are attached to the carrier element in a row pattern, and wherein at least a part of the clamping elements are releasably attachable to respective supporting elements arranged in a first row of the row pattern in such a manner that their clamping surfaces face the supporting surfaces of their associated supporting elements which are arranged in an adjacent row of the row pattern.

4. The carrier arrangement according to claim 3,
wherein at least a part of the clamping elements are releasably attachable to respective supporting elements by means of an attaching device, and wherein at least a part of the clamping element comprise a slanted surface adapted to interact with a surface formed on a supporting element in order to urge the clamping surface of the clamping element toward the supporting surface of the associated supporting element when the attaching device is fastened.

5. The carrier arrangement according to claim 4,
wherein the attaching device is adapted to extend through a bore formed in the clamping element and to engage with a thread provided in the supporting element.

6. The carrier arrangement according to claim 1,
further comprising a first end element attached to the carrier element in a first edge region thereof and having at least one supporting surface extending from the carrier surface of the carrier element and being adapted to interact with a first surface of a component to be repaired.

7. The carrier arrangement according to claim 1,
further comprising a second end element attached to the carrier element in a second edge region thereof and being configured to allow at least one clamping element to be releasably attached thereon in such a manner that its clamping surface faces the supporting surface of its associated supporting element.

8. The carrier arrangement according to claim 1,
wherein at least a part of the supporting elements comprises a heating element adapted to heat the supporting surface of the supporting elements.

9. The carrier arrangement according to claim 1,
wherein the first end element comprises a heating element adapted to heat the first end element.

10. A method for repairing a plurality of components, the method comprising the following steps:
arranging the components to be repaired on a carrier element of a carrier arrangement in such a manner that a first surface of at least a part of the components interact with a supporting surface of a supporting element which extends from a carrier surface of the carrier element,
attaching a plurality of clamping elements to the carrier element in such a manner that a clamping surface of each clamping element interacts with a second surface of a component to be repaired so as to sandwich the component between the clamping surface of the clamping element and the supporting surface of an associated supporting element and to thereby fix the component to the carrier element with a repair site of the component facing away from the carrier surface of the carrier element,
fastening the carrier arrangement to an apparatus for repairing components by selectively irradiating layers of a raw material powder applied to the repair sites of the components with electromagnetic or particle radiation, and
repairing the components by selectively irradiating layers of a raw material powder applied to the repair sites of the components with electromagnetic or particle radiation.

11. The method according to claim 10,
wherein the carrier arrangement with the components to be repaired fixed thereto, prior to being fastened to the apparatus for repairing components by irradiating layers of a raw material powder applied to the repair sites of the components with electromagnetic or particle radiation, is fastened to a machining tool for machining the repair sites of the components.

12. The method according to claim 10,
wherein at least a part of the supporting elements are attached to the carrier element in a row pattern, and wherein at least a part of the clamping elements are releasably attached to respective supporting elements arranged in a first row of the row pattern in such a manner that their clamping surfaces face the supporting surfaces of their associated supporting elements which are arranged in an adjacent row of the row pattern.

13. The method according to claim 12,
wherein at least a part of the clamping elements are releasably attached to respective supporting elements by means of an attaching device, and wherein at least a part of the clamping elements comprise a slanted surface which interacts with a surface formed on a supporting element in order to urge the clamping surface of the clamping element toward the supporting surface of the associated supporting element when the attaching device is fastened.

14. The method according to claim 10,
wherein at least one component to be repaired is arranged on the carrier element of the carrier arrangement in such a manner that its first surface interacts with a supporting surface of a first end element attached to the carrier element in a first edge region thereof which extends from the carrier surface of the carrier element.

15. The method according to claim 10,
wherein at least one clamping element is attached to a second end element attached to the carrier element in a second edge region thereof in such a manner that its clamping surface faces the supporting surface of its associated supporting element.

16. The method according to claim 10,
wherein the supporting surface of at least a part of the supporting elements is heated.

17. The method according to claim 10,
wherein the first end element is heated.

18. System for repairing a plurality of components, the system comprising:
a carrier arrangement according to claim 1, and
an apparatus for repairing components by selectively irradiating layers of a raw material powder applied to the repair sites of the components with electromagnetic or particle radiation, the apparatus comprising:
a corresponding fastening device adapted to interact with a fastening device of the carrier arrangement,
a powder application device adapted to apply a raw material powder onto the carrier arrangement such that repair sites of components to be repaired fixed thereto are covered by the raw material powder, and an irradiation device adapted to selectively irradiate electromagnetic or particle radiation onto the raw material powder applied onto the carrier arrangement so as to produce a repair segment on the repair sites of the components by an additive layer construction method.

* * * * *